US010971236B2

United States Patent
Okabe

(10) Patent No.: US 10,971,236 B2
(45) Date of Patent: Apr. 6, 2021

(54) SEMICONDUCTOR DEVICE WITH A FUNCTION OF GENERATING INHERENT INFORMATION

(71) Applicant: WINBOND ELECTRONICS CORP., Taichung (TW)

(72) Inventor: Sho Okabe, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/406,263

(22) Filed: May 8, 2019

(65) Prior Publication Data

US 2019/0371413 A1 Dec. 5, 2019

(30) Foreign Application Priority Data

May 30, 2018 (JP) .............................. JP2018-103157

(51) Int. Cl.
*G11C 16/26* (2006.01)
*H04L 9/32* (2006.01)
*G06F 21/44* (2013.01)
*G11C 16/04* (2006.01)

(52) U.S. Cl.
CPC .............. *G11C 16/26* (2013.01); *G06F 21/44* (2013.01); *G11C 16/0483* (2013.01); *H04L 9/3278* (2013.01)

(58) Field of Classification Search
CPC ...... G11C 16/26; G11C 16/0483; G06F 21/44; H04L 9/3278
USPC ..................................................... 365/185.21
See application file for complete search history.

(56) References Cited

U.S. PATENT DOCUMENTS

| 8,130,955 | B2 | 3/2012 | Trichina et al. |
| 8,937,833 | B2 | 1/2015 | Lee |
| 10,204,692 | B1* | 2/2019 | Kamata ............ G11C 16/0475 |
| 2007/0033380 | A1* | 2/2007 | Lisart .................... G06F 21/556 712/19 |
| 2009/0073760 | A1* | 3/2009 | Betser .................... G11C 16/28 365/185.2 |
| 2012/0037711 | A1 | 2/2012 | Kim et al. |
| 2015/0007337 | A1 | 1/2015 | Krutzik |

(Continued)

FOREIGN PATENT DOCUMENTS

| JP | H05136375 A | 6/1993 |
| JP | 2007207415 A | 8/2007 |

(Continued)

OTHER PUBLICATIONS

Korean Office Action based on corresponding Application No. 10-2018-0122059; dated Dec. 16, 2019.

*Primary Examiner* — Sung Il Cho
(74) *Attorney, Agent, or Firm* — Muncy, Geissler, Olds and Lowe, P.C.

(57) ABSTRACT

The present invention utilizes a new method to provide a semiconductor device having a function of generating inherent data. The NAND-type flash memory of the present invention has a memory cell array, a page buffer/sense circuit, and a differential sense amplifier that detects the potential difference of a bit line pair of a dummy array when the dummy array of the memory cell array is read out, wherein the NAND-type flash memory outputs the inherent data of the semiconductor device according to the detection result of the differential sense amplifier.

7 Claims, 7 Drawing Sheets

(56) References Cited

U.S. PATENT DOCUMENTS

| | | | |
|---|---|---|---|
| 2015/0029784 A1* | 1/2015 | Yabuuchi | G11C 11/419 |
| | | | 365/154 |
| 2015/0055417 A1 | 2/2015 | Kim et al. | |
| 2015/0278551 A1 | 10/2015 | Iyer et al. | |
| 2017/0017808 A1* | 1/2017 | Kwong | G11C 29/50012 |
| 2017/0235941 A1* | 8/2017 | Kim | G06F 21/44 |
| | | | 726/19 |
| 2019/0114097 A1* | 4/2019 | Tran | G11C 16/26 |
| 2019/0342106 A1* | 11/2019 | Li | H04L 9/3278 |

FOREIGN PATENT DOCUMENTS

| | | |
|---|---|---|
| KR | 20130016363 A | 2/2013 |
| TW | I625733 B | 6/2018 |

\* cited by examiner

| | Erase | Program | Readout | Generation of inherent data |
|---|---|---|---|---|
| selected W/L | 0 | 15~20V | 0 | 4.5V |
| unselected W/L | F | 10V | 4.5V | 4.5V |
| SGD | F | Vdd | 4.5V | 4.5V |
| SGS | F | 0 | 4.5V | 4.5V |
| SL | F | Vdd | 0 | 0 |
| P well | 21V | 0 | 0 | 0 | though a new method.

SEMICONDUCTOR DEVICE WITH A FUNCTION OF GENERATING INHERENT INFORMATION

CROSS REFERENCE TO RELATED APPLICATIONS

This Application claims priority of Japanese Patent Application No. 2018-103157, filed on May 30, 2018, the entirety of which is incorporated by reference herein.

BACKGROUND OF THE INVENTION

Field of the Invention

The present invention relates to a semiconductor device having a function of generating inherent information, and in particular to the generation of inherent information using a NAND-type flash memory.

Description of the Related Art

Along with the enhancement of the security of the electronic device, in order to prevent counterfeiting of a semiconductor device physically mounted on the electronic device, a corresponding solution is required. In one method, when the semiconductor device is given with inherent information and the inherent information is verified, the semiconductor device can be regarded as a genuine product and allowed to be used. The inherent information can be stored, for example, in a non-volatile memory of the semiconductor device, etc. However, this method has risks, such as the inherent information is read by analyzing the semiconductor device, or the inherent information is read by improperly accessing from the outside to the semiconductor device.

In recent years, PUF (Physical Unclonable Function) which is physically incapable of being copied has attracted considerable attention. PUF is a technology that uses unpredictable, confidential, and long-lasting physical information as inherent data. For example, PUF using an arbiter circuit, PUF using a ring oscillator, PUF using an SRAM, and the like are proposed. Furthermore, in a NAND-type flash memory, PUF using erasure verification (Patent Document 1), PUF using a voltage adjustment unit (Patent Document 2), or the like is disclosed.

Prior Art

Patent Document 1: US Patent Publication No. 2015/0007337A1
Patent Document 2: US Patent Publication No. 2015/0055417A1

In the design and manufacture of a semiconductor device, it is possible to provide a semiconductor device having reproducibility and high reliability by suppressing or minimizing unevenness (variation) of circuit elements. On the other hand, minimizing the unevenness of circuit elements, wiring, etc., brings uniformity to circuit elements or wiring, and may cause a decrease in randomness (non-predictability) of PUF or inherent data. Therefore, it is desirable to have a PUF technology that can ensure the randomness of inherent data while maintaining reproducibility and reliability.

The purpose of the present invention is to provide a semiconductor device having an inherent data function through a new method.

BRIEF SUMMARY OF THE INVENTION

A detailed description is given in the following embodiments with reference to the accompanying drawings.

A semiconductor device according to the present invention includes: a memory array including a NAND-type string; a selection means for selecting a specific area of the memory array; a reading means for reading out the specific area selected by the selection means; a detecting means for detecting the potential difference of the bit line pair of a specific area read by the reading means; and a generating means for generating inherent data of the semiconductor device based on the detection result of the detecting means.

According to the present invention, since the potential difference between the bit line pair of the specific area read from the memory cell array is output based on the detection result, it is possible to maintain the randomness of inherent data while maintaining the reproducibility or reliability of the semiconductor device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Next, an embodiment of the present invention will be described with reference to the drawings. The semiconductor device of the present invention has a function of generating inherent data of the semiconductor device and outputting it to the outside. In a certain embodiment, the semiconductor device of the present invention includes a NAND-type flash memory, and the NAND-type flash memory generates inherent data and outputs it to the outside. The semiconductor device of the present invention may be a NAND-type flash memory itself or a semiconductor circuit having other functions.

Figure 1:
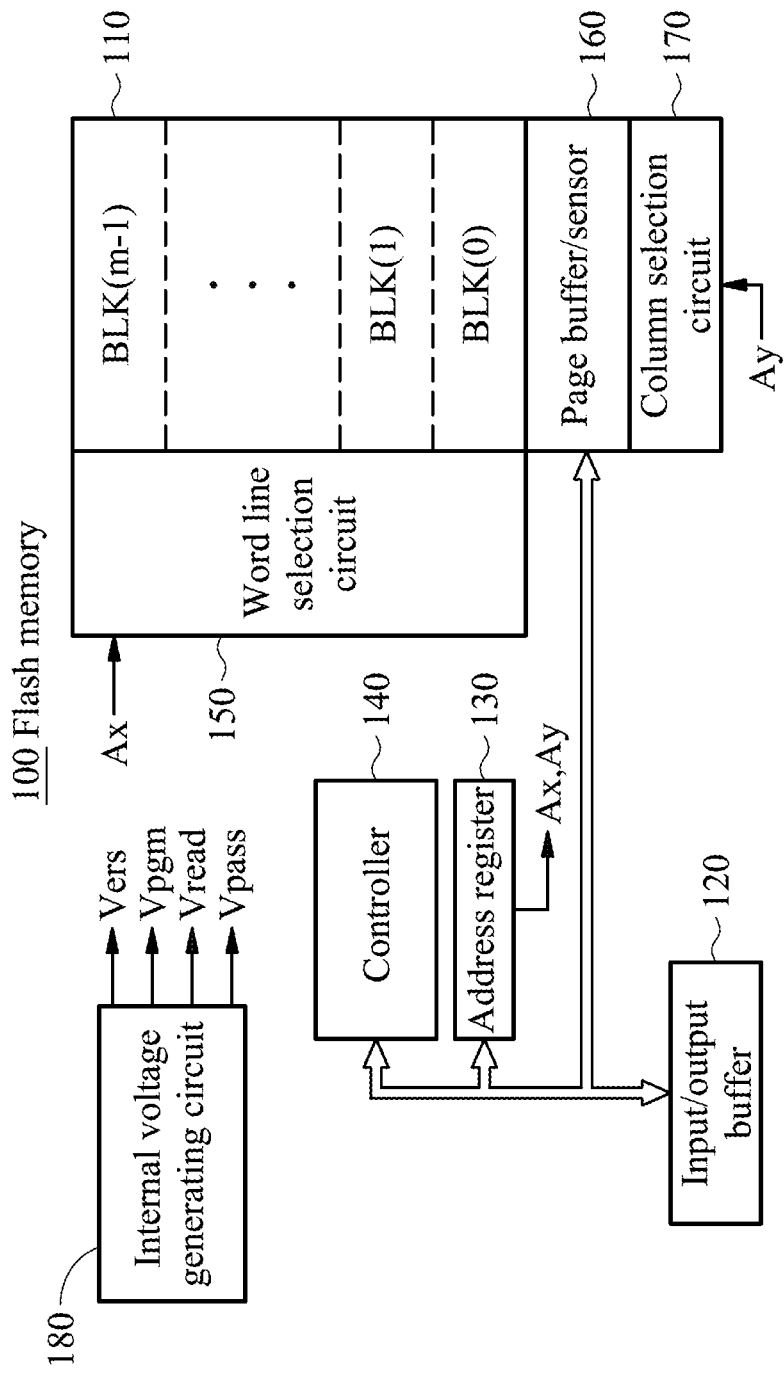
FIG. 1 shows the architecture of a NAND-type flash memory in accordance with an embodiment of the present invention.

FIG. 1 shows the architecture of a NAND-type flash memory in accordance with an embodiment of the present invention. The flash memory 100 of the present embodiment includes: a memory cell array 110, an input/output buffer 120, an address register 130, a controller 140, a line selection circuit 150, a page buffer/sensor 160, a column selection circuit 170, and an internal voltage generating circuit 180. The memory cell array 110 is formed by a plurality of memory cells arranged in a matrix. The input/output buffer 120 is connected to an external input/output terminal I/O and holds input and output data. The address register 130 receives the address data from the input/output buffer 120. The controller 140 controls each portion according to the command data and external control signals (CLE, ALE, etc.) from the input/output buffer 120. The line selection circuit 150 performs block selection and page selection based on the row address information Ax from the address register 130. The page buffer/sensor 160 holds the data read from the selected page and the data to be programmed to the selected page. The column selection circuit 170 performs the selection of the data in the page buffer/sense circuit 160 based on the column address information Ay from the address register 130. The internal voltage generating circuit 180 generates voltages (program voltage Vpgm, pass voltage Vpass, erase voltage Vers, read voltage Vread, etc.) required for data reading, programming, erasing, and the like.

Figure 2:
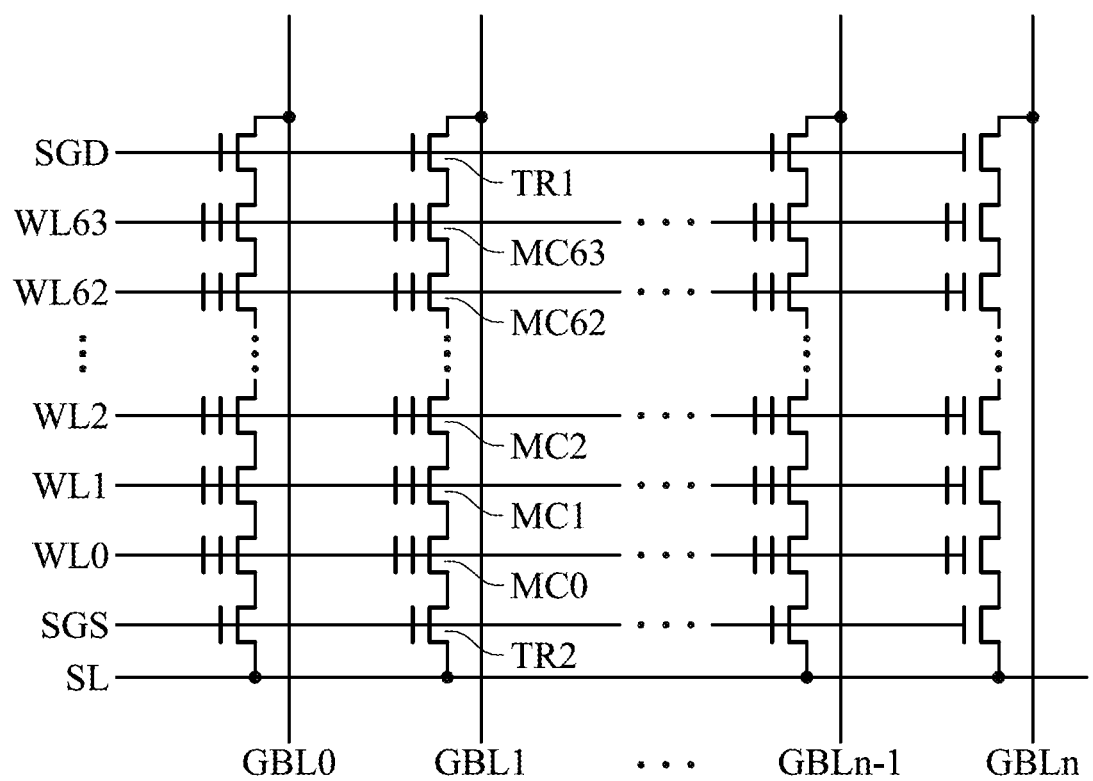
FIG. 2 shows the architecture of a NAND-type string of a memory cell array in accordance with an embodiment of the present invention.

The memory cell array 110 has m memory blocks BLK (0), BLK(1), . . . , BLK(m−1) in the column direction, and one memory block is formed with a plurality of NAND strings as shown in FIG. 2. A NAND string includes a plurality of memory cells MCi (i=0, 1, . . . , 62, 63) connected in series, a bit line selection transistor TR1 connected to the drain side of the memory cell MC63, and a source line selection transistor TR2 connected to the source side of the memory cell MC0. The control gate of the memory cell MCi is connected to a corresponding word line WLi, the gate of the bit line selection transistor TR1 is connected to a selection gate line SGD, and the gate of the source line selection transistor TR2 is connected to a selection gate line SGS. The word line selection circuit 150 selectively drives the selection gate transistors TR1 and TR2 through the selection gate signals SGD and SGS in accordance with the row address Ax in each operation state.

The NAND string may be in the form of a two-dimensional array formed on the surface of the substrate, or may be in the form of a three-dimensional array using a semiconductor layer formed on the surface of the substrate. Also, a memory cell may be in the form of an SLC storing one bit (two-value data) or in the form of an MLC storing a plurality of bits.

NAND strings of each block are connected to the global bit lines GBL0, GBL1, . . . GBLn through the bit line selection transistor TR1, and the global bit lines GBL0, GBL1, . . . GBLn are connected to the page buffer/sense circuit 160. Each of the global bit lines is composed of, for example, a metal wiring, and extends from the block (0) of the memory cell array 110 toward the block (m−1).

Figure 3:
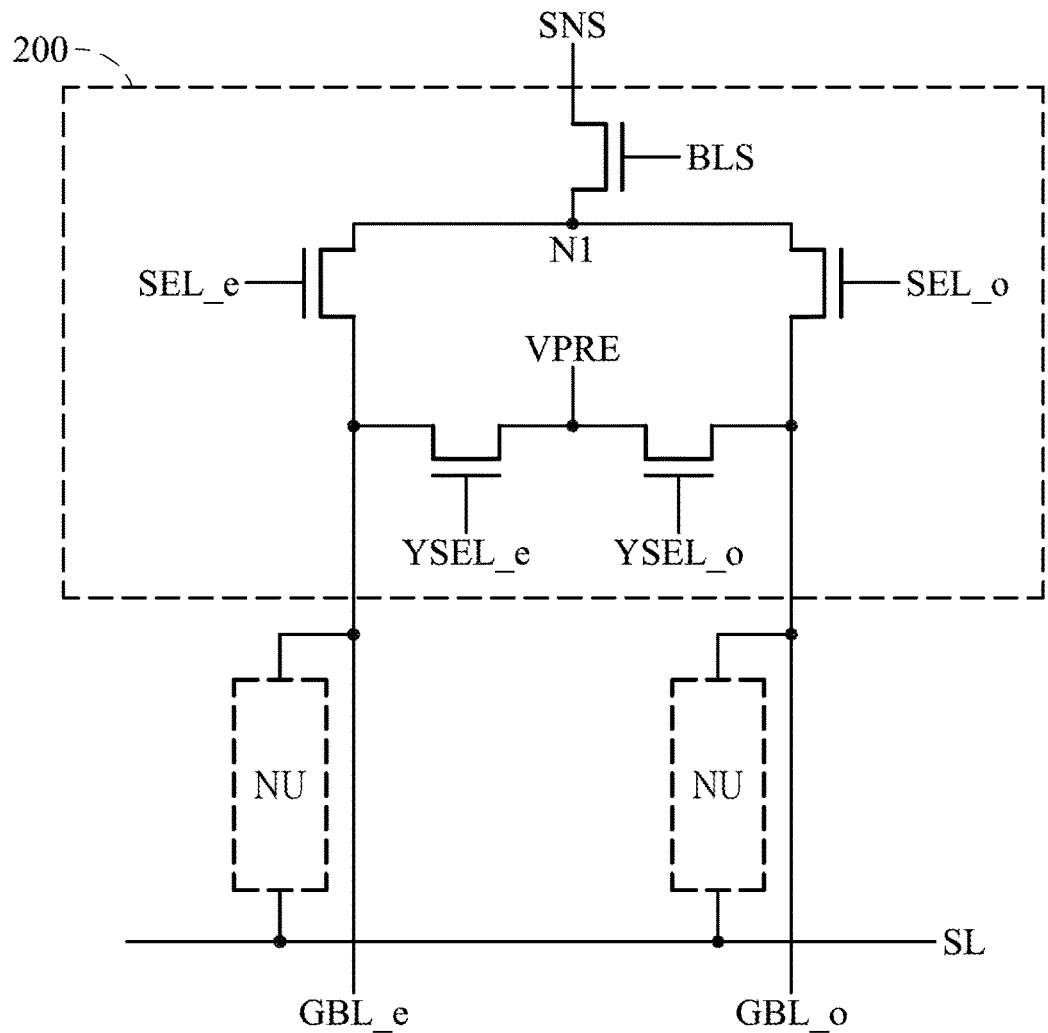
FIG. 3 shows an example of a bit line selection circuit in accordance with an embodiment of the present invention.

Next, the page buffer 160 will be described. The page buffer 160, as shown in FIG. 3, includes a bit line selection circuit 200 for selecting even-numbered global bit lines or odd-numbered global bit lines. FIG. 3 shows a pair of global bit lines comprising an even-numbered bit lines GBL_e connected to one NAND string NU and odd-numbered bit lines GBL_o connected to one NAND string NU. The bit line selection circuit 200 selects the even-numbered bit line GBL_e or the odd-numbered bit line GBL_o and electrically connects the selected even-numbered bit line GBL_e or the odd-numbered bit line GBL_o to a sense circuit (sensing node SNS) of the sensor/sense circuit 160 during reading or programming operations. That is, although the page buffer/sense circuit 160 corresponds to the amount of one page, one page buffer/sense circuit 160 is shared by a pair of even-numbered bit lines GBL_e and odd-numbered bit lines GBL_o.

The bit line selection circuit 200 includes: a bit line selection transistor BLS, an even-numbered selection transistor SEL_e, an odd-numbered selection transistor SEL_o, an even-numbered bias selection transistor YSEL_e, and an odd-numbered bias selection transistor YSEL_o. The bit line selects the transistor BLS is electrically connected to the sensing node SNS during the read operation. The even-numbered selection transistor SEL_e is connected in series between the node N1 of the bit line selection transistor BLS and the even-numbered bit line GBL_e. The odd-numbered selection transistor SEL_o is connected in series between the node N1 of the bit line selection transistor BLS and the odd-numbered bit line GBL_o. The even-numbered bias selection transistor YSEL_e is connected between the even-numbered bit line GBL_e and a virtual potential VPRE. The odd-numbered bias selection transistor YSEL_o is connected between the odd-numbered bit line GBL_o and the virtual potential VPRE.

The bit line selection transistor BLS, the even-numbered selection transistor SEL_e, the odd-numbered selection transistor SEL_o, the even-numbered bias selection transistor YSEL_e, and the odd-numbered bias selection transistor YSEL_o are formed by NMOS transistors, and each gate is applied with a control signal from the controller 140. Furthermore, the virtual potential VPRE is supplied with various bios voltages or pre-charge voltages from the internal voltage generating circuit 180 in response to the operation of the controller 140.

For example, in the read operation, when the even-numbered page is read, the even-numbered selection transistor SEL_e, the bit line selection transistor BLS is turned on, the odd-numbered selection transistor SEL_o is turned off, the even-numbered bit line GBL_e is selected, and the odd-numbered bits are selected. Line GBL_o is not selected. Furthermore, the even-numbered bias selection transistor YSEL_e is turned off, the odd-numbered bias selection transistor YSEL_o is turned on, and the unselected odd-numbered bit line GBL_o is supplied with GND from the virtual potential VPRE. On the other hand, when the odd-numbered page is read, the odd-numbered selection transistor SEL_o, the bit line selection transistor BLS are turned on, the even-numbered selection transistor SEL_e is turned off, the odd-numbered bit line GBL_o is selected, and the even-numbered bit line GBL_e is not selected. Furthermore, the odd-numbered bias selection transistor YSEL_o is turned off, the even-numbered bias selection transistor YSEL_e is turned on, and the unselected even-numbered bit line GBL, e is supplied with GND from the virtual potential VPRE. In this way, the bit line shield reading of the even-numbered page and the odd-numbered page is performed.

Furthermore, in the program operation, the even-numbered pages and the odd-numbered pages are alternately programmed, and the unselected pages are supplied with voltages from the virtual potential VPRE for suppressing interference of the program operation.

Figure 4:
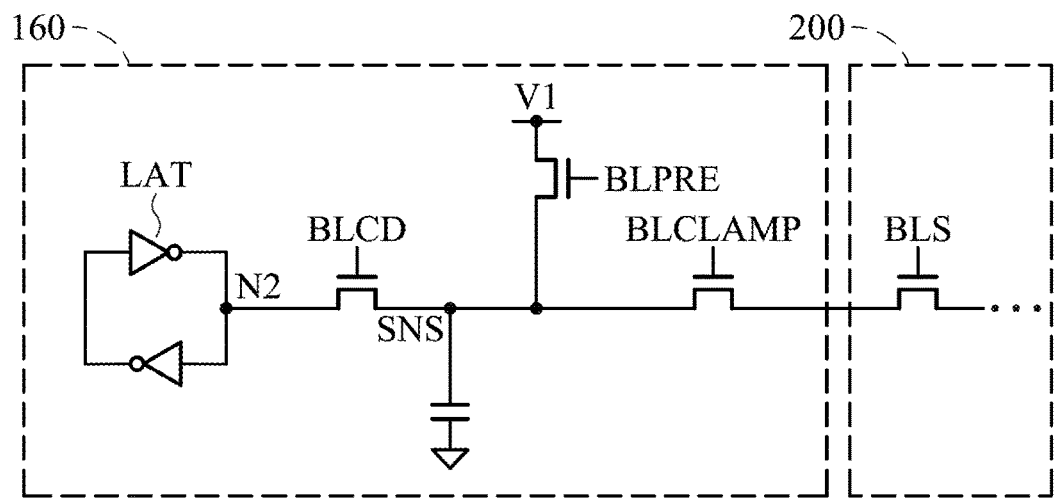
FIG. 4 shows an example of a page buffer/sense circuit in accordance with an embodiment of the present invention.

FIG. 4 shows an example of a page buffer/sense circuit 160. The configuration of the page buffer/sense circuit 160 includes: a transistor BLPRE, a transistor BLCLAMP, a sensing node SNS, a transistor BLCD, and a latch circuit. The transistor BLPRE is for pre-charging a voltage supplied from the voltage supply portion V1 to the bit line. The transistor BLCLAMP is used to clamp the bit line. The transistor BLCD transmits charges between the sensing node SNS and a latch node N2. The latch circuit is connected to the latch node N2. The transistor BLCLAMP is connected to the bit line selection transistor BLS of the bit line selection circuit 200 of the bit line selection circuit 200.

In the read operation, the pre-charge voltage supplied from the voltage supply portion V1 is applied to the even-numbered bit line GBL_e or the odd-numbered bit line GBL_o selected by the bit line selection circuit 200 through the transistors BLPRE and BLCLAMP. Then, the read voltage is applied to the selected word line, and the read pass voltage is applied to the unselected word line. If the memory cell of the selected word line is turned on, the pre-charge voltage of the global bit line is discharged to the source line, SL, and the sensing node SNS becomes the GND level. If the memory cell is turned off, the global bit line is isolated from the source line SL, and the sensing node SNS is maintained at the pre-charge voltage. The charges of the sensing node SNS are transmitted to the node N2 through the transistor BLCD, and the latch circuit LAT maintains the H or L level by the potential of the node N2.

Figures 5, 6:
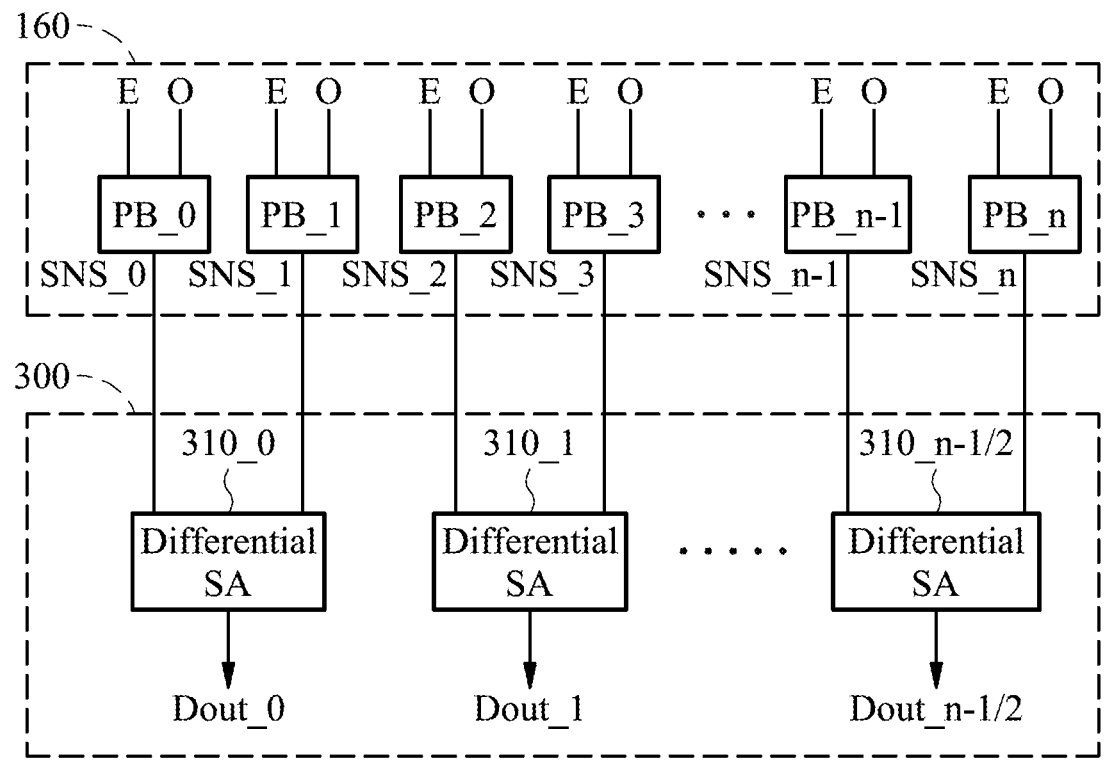
FIG. 5 shows an example of an inherent data generating circuit in accordance with an embodiment of the present invention.
FIG. 6 is a table showing the bias voltages applied during each operations of the NAND-type flash memory.

FIG. 5 shows an example of an inherent data generating circuit. The inherent data generating circuit 300 is connected to the page buffer/sense circuit 160. When a specific area of the memory cell array 110 is read, the inherent data generating circuit 300 detects the potential difference of the sensing nodes connected to a pair of adjacent global bit lines, and uses this detection result to generate inherent data and output it.

Specifically, the inherent data generating circuit 300 includes a differential sense amplifier 310_0 connected to the adjacent page buffers PB_0 and PB_1, a differential sense amplifier 310_1 connected to the adjacent page buffers PB_2 and PB_3, . . . , a differential sense amplifier 310_(n−1)/2 connected to the adjacent page buffers PB_n−1 and PB_n (any of the differential amplifiers can be referred to as a differential amplifier 310). If the number of page buffer/sense circuits 160 is one page, the number of differential sense amplifiers 310 is ½ page.

The differential sense amplifier 310_0 detects the potential difference between the sensing node SNS_0 of the page buffer PB_0 and the sensing node SNS_1 of the page buffer PB_1 adjacent thereto, and outputs the data Dout_0 indicating this detection result. Similarly, the other differential sense amplifiers 310 detect the potential difference of the sensing nodes of the adjacent page buffers, and output the data Dout_1, . . . , Dout_(n−1)/2 indicating the detection results. In the case where the even-numbered bit lines is selected by the bit line selection circuit 200, the differential sense amplifier 310 detects the potential difference of the sensing nodes connected to the adjacent even-numbered bit lines. Also, in the case where the odd-numbered bit line is selected by the bit line selection circuit 200, the differential sense amplifier 310 detects the potential difference of the sensing nodes connected to the adjacent odd-numbered bit lines. The differential sense amplifier 310 is activated by the controller 140 when the inherent data is generated.

FIG. 6 is a table showing the bias voltages applied during each operations of the NAND-type flash memory. In the read operation, a certain positive voltage is applied to the bit line, a certain read voltage (for example, 0V) is applied to the selected word line, a read pass voltage Vpass (for example, 4.5V) is applied to the unselected word line, a positive voltage (for example, 4.5V) is applied to the selection gate lines SGD and SGS, the bit line selection transistor and the source line selection transistor of the NAND string are turned on, and 0 V is applied to the common source line. In the program (write) operation, a high voltage program voltage Vpgm (15 to 20V) is applied to the selected word line, and an intermediate potential (for example, 10V) is applied to the unselected word line. The bit line selection transistor is turned on, the source line selection transistor is turned off, and the potential corresponding to the data of "0" or "1" is supplied to the bit line. In the erase operation, 0V is applied to the selected word line in the block, a high voltage (for example, 20V) is applied to the P well, and the electrons of the floating gate are drawn to the substrate, thereby erasing the data in units of blocks. The bias voltage at the time of generating the inherent data will be described later.

Figure 7:
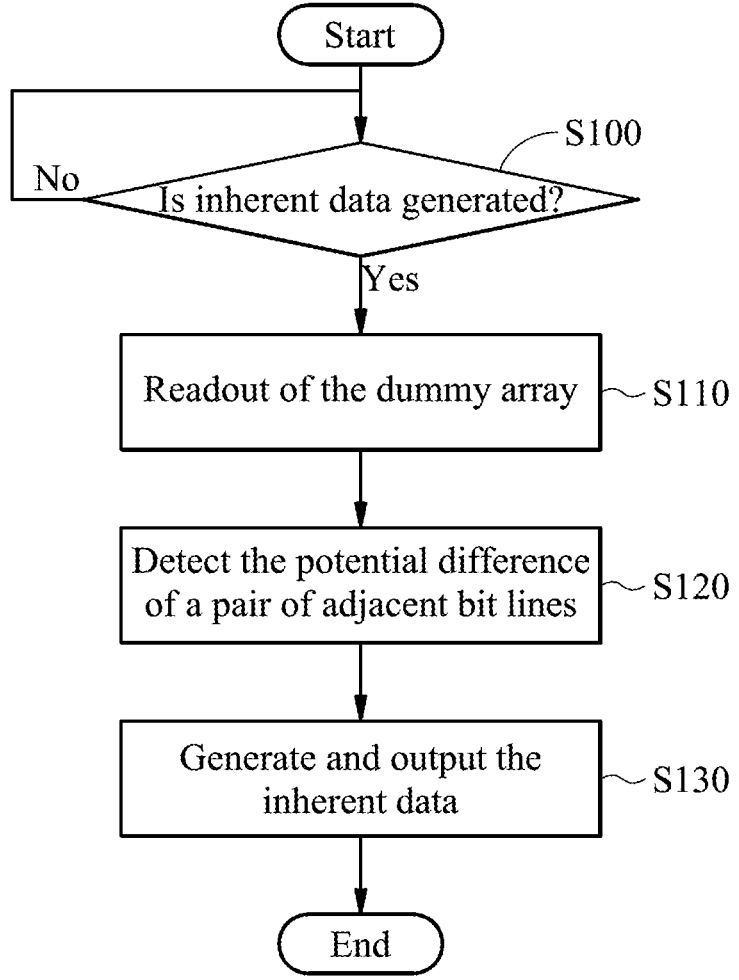
FIG. 7 is a flow chart showing the actions of the inherent data generation in accordance with the embodiment of the present invention.

Next, the operation of generating the inherent data of the NAND flash memory of the present embodiment will be described. FIG. 7 is a flow chart for explaining the generation operation for the inherent data. The controller 140 is constituted by, for example, a microcomputer or a state machine capable of executing a software program. In addition to the normal control of the readout operation, the program operation, and the erase operation, the controller 140 also controls the generation of the inherent data based on an external control signal or an external command.

In a certain embodiment, the controller 140 has a function of determining whether or not to generate inherent data (S100). For example, when the controller 140 receives an instruction from the outside indicating the generation of the inherent data, the controller 140 executes the generation of the inherent data. Alternatively, the controller 140 executes the generation of the inherent data when the booting procedure is performed at the time of power loading or when a predetermined action is performed.

Figure 8:
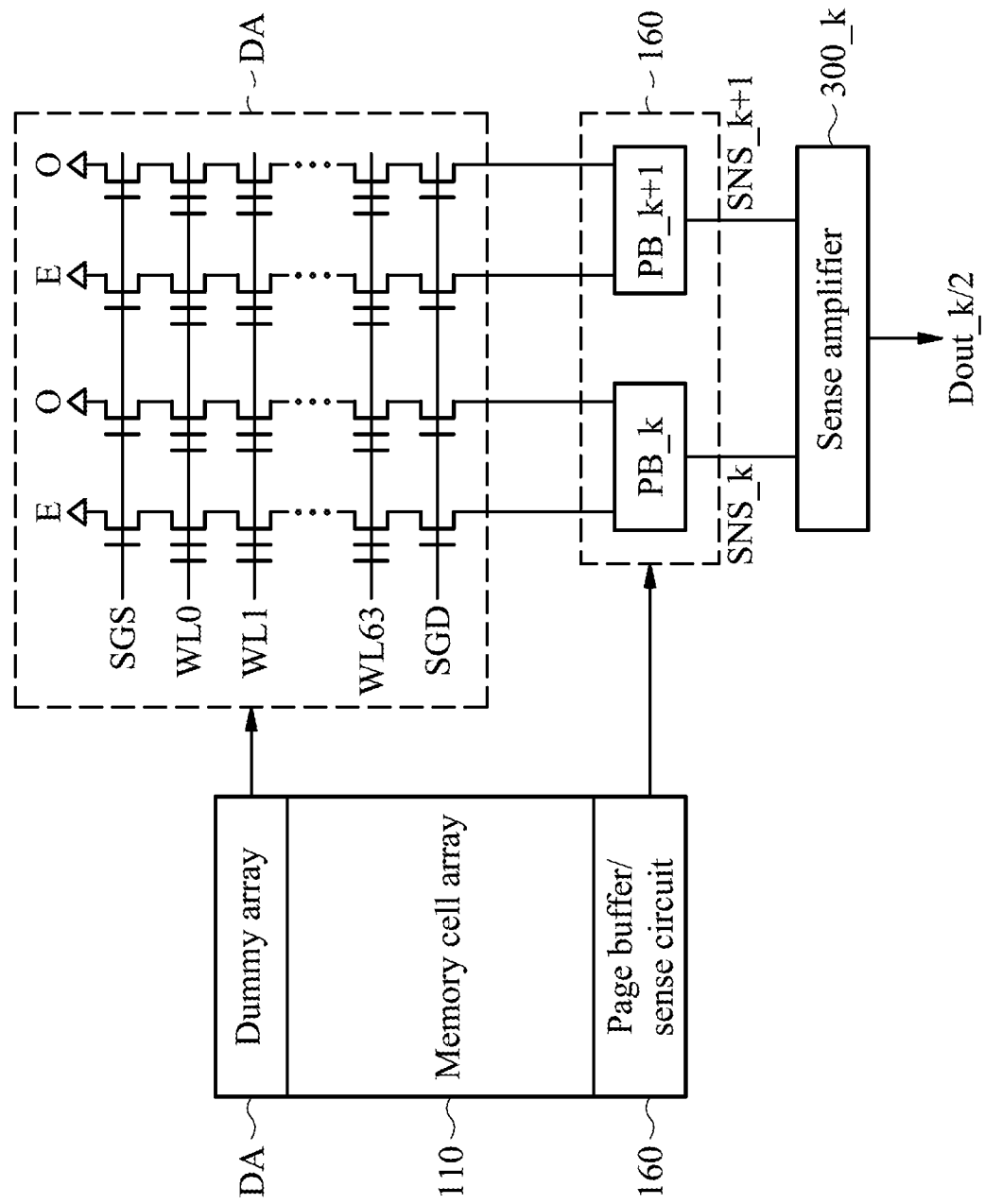
FIG. 8 is a diagram showing an example of selection of a virtual array in accordance with an embodiment of the present invention.

When it is determined that the generation of the inherent data is to be performed, the controller 140 starts the reading of the virtual array of the memory cell array 110 through the word line selection circuit 150 (S110). The virtual array is a specific area on the memory cell array suitable for generating inherent data, and the address information for selecting the virtual array is stored in the memory of the controller 140 in advance. In a certain embodiment, the virtual array is set in the farthest block BLK(m−1) from the page buffer/sense circuit 160 or a block in the vicinity thereof as shown in FIG. 8. In other words, the virtual array DA is an area in which the wiring length of the global bit line connecting the block to the page buffer/sense circuit 160 is the longest one. Furthermore, the virtual array DA may be an area that the user cannot access, or may be a memory area that the user can access.

The farthest block BLK(m−1) has a longer wiring length of the global bit line than other blocks, so uneven wiring (such as line width, film thickness, pitch, etc.) greatly affects the RC value (time constant) thereof. Therefore, the characteristics of charge and discharge between adjacent bit lines are likely to vary greatly.

Figure 9:
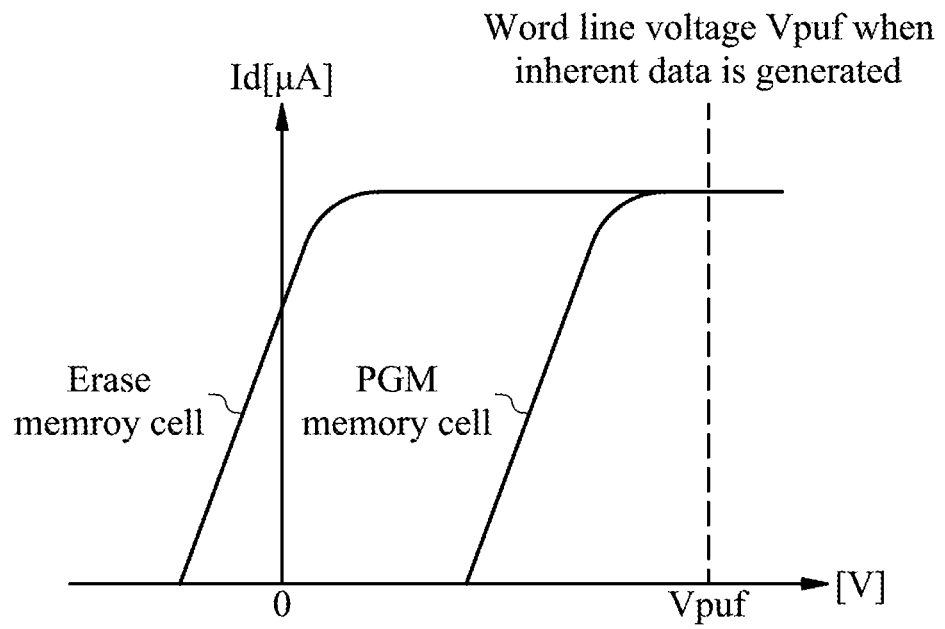
FIG. 9 is a diagram showing an example of word line voltages applied to the virtual array.

The read operation of the virtual array DA is the same as the normal read operation. The even-numbered bit line or the odd-numbered bit line selected by the bit line selection circuit 200 is pre-charged, and the odd-numbered bit line or the even-numbered bit line not selected is supplied with GND. After pre-charging, the word line selection circuit 150 applies a pass voltage Vpuf to all word lines of the block which is selected as a virtual array DA. The pass voltage Vpuf turns on the memory cell in regardless with the memory state of the memory cell. That is to say, the voltage Vpuf is a voltage which is much higher than the threshold value to turn on the memory cell (data "1") and the program memory cell (data "0") as shown in FIG. 9. Furthermore, the pass voltage Vpuf may be the same level as the pass voltage applied to the unselected word line during the read operation (see FIG. 6).

The virtual array DA is applied with the pass voltage Vpuf, so all the memory cells of the virtual array DA are turned on, and the precharge voltage of the global bit line, that is, the voltage of the sensing node SNS is discharged to the source line SL of the GND level through the NAND string. During this sensing operation, by the differential sense amplifier 300 connected to the sensing node SNS, the potential difference of the adjacent bit line pair is detected (S120). For example, when SNSk>SNSk+1, the differential sense amplifier 300 outputs "0" as Dout_k. When SNSk≤SNSk+1 the differential sense amplifier 300 outputs "1" as Dout_k.

When the potential difference of the bit line pair is detected by reading the virtual array DA, the controller 140 outputs the inherent data to the outside based on the detection result (S130). When the inherent data is generated, the readout of the virtual array DA may be either the even-numbered bit line or the odd-numbered bit line, or both the even-numbered bit line and the odd-numbered bit line. The output method of the inherent data is arbitrary. For example, all of the detected data may be output, or the data of the number of bits or the bit line determined in advance by the row selection circuit 170 may be output. Furthermore, the number of bits of the inherent data to be output may be adjusted in response to the input/output terminal of the NAND flash memory. Furthermore, when the NAND-type flash memory is equipped with the SPI (Serial Peripheral Interface) function, it is possible to output the inherent data in synchronization with the external serial clock.

According to the present embodiment, the potential difference of the bit line pair is detected at the time of reading the virtual array, and the inherent data of the semiconductor device is generated. Therefore, the non-predictive inherent data with high reproducibility can be obtained by a relatively simple structure.

Figure 10:
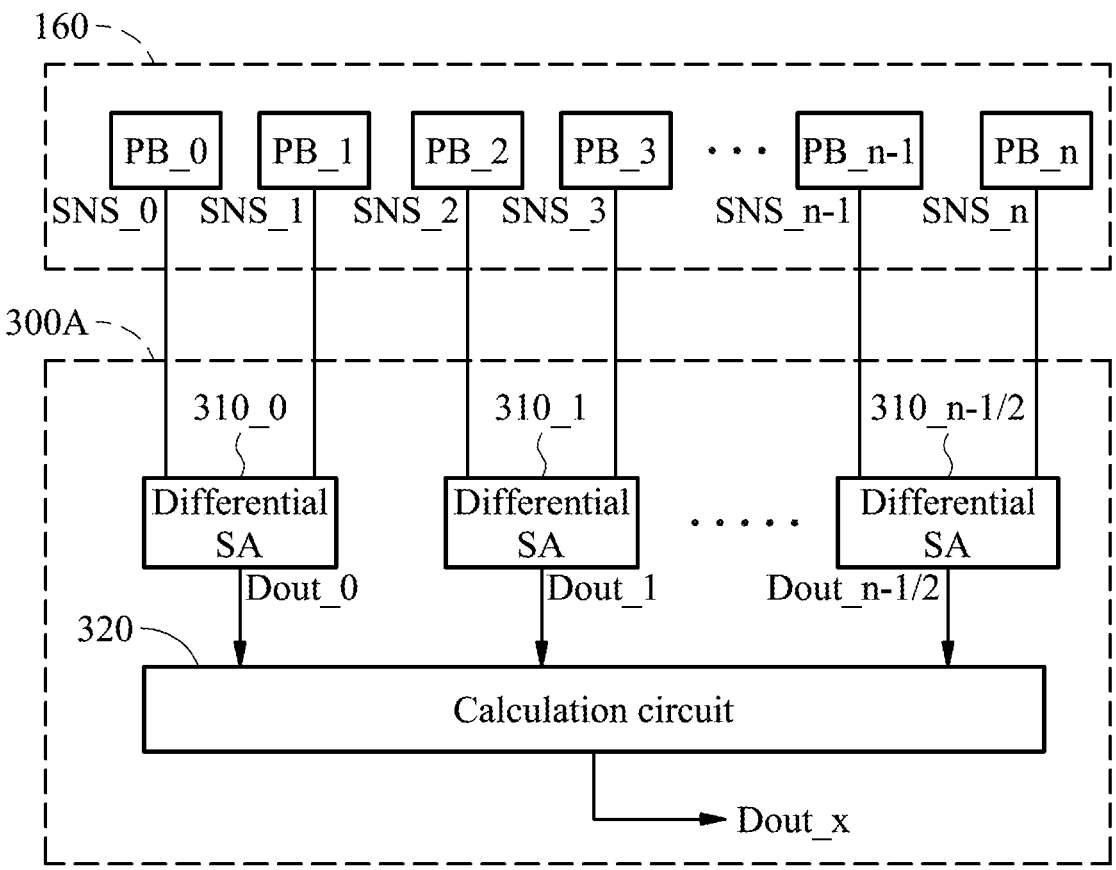
FIG. 10 is a diagram showing a modification of the present invention.

Next, the other embodiment of the present invention will be described. FIG. 10 shows the configuration of the inherent data generating circuit 300A of the other embodiment. In the present embodiment, the inherent data generation circuit 300A is provided with a calculation circuit 320. The calculation circuit 320 receives the output data Dout_0, Dout_1, . . . , Dout_n−½ of the plurality of differential sense amplifiers 310_0, 310_1, . . . , 300_n−½, and performs calculation processing on those data. The calculation circuit 320 may, for example, mask a portion of the output data of the differential sense amplifier 310, encode (compress) the output data, or logically operate the output data of the even-numbered bits and the output data of the odd-numbered bits, and output the result as the inherent data Dout_x.

In the above embodiment, when the inherent data is generated, the pass voltage is applied to all the word lines of the virtual array DA for reading, but the specific page of the virtual array DA may be read only. The specific page can be set to any page of WL0 to WL63, and the selected word line of the specific page is applied with the same read voltage (for example, 0V) as in a normal read operation, and the other unselected word lines are applied with the pass voltage Vpuf (for example 4.5V). In this case, the memory cell of the specific page needs to be set to an erase memory cell storing the data "1". Thereby, the reading operation for generating the inherent data can be performed under the same bias conditions as the normal reading operation.

In the above embodiment, the differential sense amplifier 310 detects the potential difference between adjacent bit lines during the reading operation, but this is only an example, and may be other embodiments. For example, the differential sense amplifier 310 can also detect the potential difference of each sensing node of the even-numbered page buffer/sense circuit and each sensing node of the odd-numbered page buffer/sense circuit. In addition, the potential difference of each sensing node of the page buffer/sense circuit selected according to a predetermined rule may be detected.

Furthermore, in the above embodiment, although the example in which the page buffer/sense circuit 160 corresponds to one page and the differential sense amplifier 310 corresponds to the amount of ½ page is showed, the number of the differential sense amplifiers 310 is arbitrary. As long as the non-prediction (randomness) of the inherent data can be obtained, it can be a number smaller than ½ page.

Furthermore, in the above embodiment, the example of the shield reading of the even-numbered bit line or the odd-numbered bit line selected by the bit line selection circuit is shown, but the shield reading is not necessary in the present invention. In this case, the reading of the selected page is performed with all of the bit lines, and the differential sense amplifier can detect the potential difference between the adjacent even-numbered bit line and odd-numbered bit line physically.

Furthermore, in the above embodiment, the unit connected to the word line of the virtual array DA is exemplified by a memory cell, but in the present invention, a normal MOS transistor may be used instead of the memory cell. That is, a part or all of the memory cells of the NAND string constituting the virtual array DA can be replaced with a normal MOS transistor. Here, a normal MOS transistor refers to a MOS transistor in which the threshold values of the conduction due to programming or erasing do not change. As a representative MOS transistor, there is depletion type, enhancement type, or intrinsic type, but any type of MOS transistor can be used instead of the memory cell to perform readout for generating inherent data.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A semiconductor device, comprising
    a memory array comprising NAND-type strings;
    a selection means selecting a specific area of the memory array;
    a readout means reading out a specific area selected by the selection means;
    a detection means detecting a potential difference of a bit line pair of a specific area read by the readout means; and a generation means generating inherent data of the semiconductor device based on the detection result of the detection means;
wherein the specific area is a block that is physically farthest from the readout means,
wherein the selection means applies a voltage to all word lines within a selected block, the voltage is independent of memory states of memory cells and turns on the memory cells, and the voltage is higher than a threshold value to turn on an erase memory cell and a program memory cell.

2. The semiconductor device as claimed in claim 1, wherein the detection means is electrically connected to a sensing node of the readout means, and the detection means comprises a differential sense amplifier for detecting a potential difference of the sensing node.

3. The semiconductor device as claimed in claim 1, wherein the bit line pair comprises a pair of bit lines that are adjacent during a reading operation.

4. The semiconductor device as claimed in claim 1, wherein when the readout means performs a reading of an even-numbered bit line or an odd-numbered bit line, the bit line pair is adjacent even-numbered bit lines or adjacent odd-numbered bit lines.

5. The semiconductor device as claimed in claim 1, wherein the bit line pair comprises bit lines selected according to a predetermined rule.

6. The semiconductor device as claimed in claim 1, wherein the generation means comprises a calculation circuit for calculating data indicating a detection result of the detection means, and the generation means outputs a calculation result of the calculating circuit as inherent data.

7. The semiconductor device as claimed in claim 1, further comprising:
a control means controlling the generation of the inherent data,
wherein the control means controls the selection means, the readout means, the detection means, and the generation means to generate the inherent data during a booting procedure or in response to an external request.

\* \* \* \* \*